(12) United States Patent
Mullet et al.

(10) Patent No.: US 7,014,386 B1
(45) Date of Patent: Mar. 21, 2006

(54) SCREW CONNECTION OF COMPONENTS TO SHEET MATERIAL AND METHOD OF EFFECTING CONNECTION

(75) Inventors: Willis J. Mullet, Pensacola Beach, FL (US); Albert W. Mitchell, Pace, FL (US)

(73) Assignee: Wayne-Dalton Corp., Mt. Hope, OH (US)

( * ) Notice: Subject to any disclaimer, the term of this patent is extended or adjusted under 35 U.S.C. 154(b) by 0 days.

(21) Appl. No.: 09/007,527

(22) Filed: Jan. 15, 1998

(51) Int. Cl.
*F16B 23/00* (2006.01)

(52) U.S. Cl. .................. 403/362; 403/408.1; 411/188; 411/189; 160/399

(58) Field of Classification Search ............... 403/362, 403/408.1, 393, 404, 282; 411/188, 189, 411/386, 387.3, 387.1, 387.4, 399, 411, 424; 160/201, 229.1
See application file for complete search history.

(56) References Cited

U.S. PATENT DOCUMENTS

| | | | | |
|---|---|---|---|---|
| 3,478,639 A | * | 11/1969 | Gruca | 411/387.1 |
| 3,585,984 A | * | 6/1971 | Brown | 411/387.4 |
| 3,812,639 A | * | 5/1974 | Sygnator | 403/408.1 |
| 3,815,657 A | | 6/1974 | Malek et al. | 160/229 |
| 4,238,544 A | | 12/1980 | Mullet | 428/71 |
| 4,241,638 A | * | 12/1980 | Shimizu et al. | 411/386 |
| 4,284,119 A | | 8/1981 | Martin et al. | 160/232 |
| 4,310,272 A | * | 1/1982 | Rich et al. | 403/408.1 X |
| 4,477,217 A | * | 10/1984 | Bonacorsi | 411/387.4 |
| 4,518,294 A | * | 5/1985 | Barth | 411/188 |
| 4,659,246 A | * | 4/1987 | Sugiyama | 403/408.1 |
| 4,685,266 A | | 8/1987 | Mullet | 52/309.11 |
| 4,705,441 A | * | 11/1987 | Arnold | 411/399 X |
| 4,749,018 A | * | 6/1988 | Alten | 160/229.1 |
| 4,749,319 A | * | 6/1988 | Sygnator | 411/188 |
| 4,749,322 A | * | 6/1988 | Sygnator | 411/387.3 |
| 4,812,095 A | * | 3/1989 | Piacenti et al. | 411/188 |
| 4,844,676 A | * | 7/1989 | Adamek | 411/386 |
| 5,002,114 A | | 3/1991 | Hörmann | 160/229.1 |
| 5,141,376 A | * | 8/1992 | Williams et al. | 411/387.4 |
| 5,183,359 A | * | 2/1993 | Barth | 411/188 |
| 5,304,023 A | | 4/1994 | Toback et al. | 411/387.3 |
| 5,356,253 A | * | 10/1994 | Whitesell | 411/188 |
| 5,435,108 A | | 7/1995 | Overholt et al. | 52/309.11 |
| 5,622,464 A | * | 4/1997 | Dill et al. | 411/387.3 X |
| 5,772,374 A | * | 6/1998 | Ide et al. | 411/386 |
| 5,779,417 A | * | 7/1998 | Barth et al. | 411/399 X |

FOREIGN PATENT DOCUMENTS

DE         2908499    *   9/1980

OTHER PUBLICATIONS

Sheet Metal Rim Holes with Screw Thread, Feb. 1980, DIN-Normen, UDC 621.882.082.1:62-414/415, entire document.*

* cited by examiner

*Primary Examiner*—John R. Cottingham
(74) *Attorney, Agent, or Firm*—Renner Kenner Greive Bobak Taylor & Weber

(57) ABSTRACT

A secure connection (10) of a component to a sheet material including, an extent of thin sheet metal (20) having an attaching surface (36), a component (30) having a mating surface (37) abutting the attaching surface, an aperture (35) in the mating surface, and a tapping screw (40) threaded in the aperture and penetrating the attaching surface, the aperture sized relative to the size of the screw as a function of the thickness of the component, whereby the tapping screw has portions of the sheet metal clamped between the tapping screw and the component for establishing retentive forces between the component and the sheet-metal material.

25 Claims, 1 Drawing Sheet

SCREW CONNECTION OF COMPONENTS TO SHEET MATERIAL AND METHOD OF EFFECTING CONNECTION

TECHNICAL FIELD

The present invention relates generally to a screw connection of components to sheet material and a method for effecting the connection. More particularly, the present invention relates to a screw connection of components to thin sheet material that permits achieving attachment of the components to the sheet material. More specifically, the present invention relates to a screw connection of components to thin sheet-metal material, with the elements configured to achieve secure attachment of the components to the sheet-metal material without the screw stripping the screw threads formed in the sheet-metal material. The present invention further relates to a method for achieving the screw connection of the present invention.

BACKGROUND ART

It has long been known to employ screws as a type of fastener for attaching two or more components together to constitute what is essentially an integral body within the boundaries of the operating parameters of a system tending to separate the components from a base material. One particular type of connection involves the attachment of one or more components to a sheet material as by the utilization of screws. An extensive use of screw fasteners has developed in regard to attaching layers of sheet metal or attaching other components to sheet metal with what are known as tapping screws. The most basic tapping screws are threaded fasteners that have the ability to tap their own mating internal threads when driven into preformed holes in metallic and non-metallic materials. As these tapping screws were widely used in sheet-metal applications, such as ducts for heating and ventilating systems, they came to be known as "sheet-metal screws." Another widespread usage of tapping screws is in relation to attaching components to insulated composite laminate panels having thin steel skins or a covering formed about foamed plastic materials. Extensive use of such panels is for sectional doors for commercial and residential applications, wherein a plurality of laminate panels are made into doors by attaching components, such as hinges, bottom brackets, struts, roller brackets, and other hardware necessary to the function of the door. As will be appreciated hereinafter, the present invention is particularly useful in certain applications, such as sectional door panels wherein the interior of the panel is not accessible from the outside, which require the attachment of components once the panel has been formed.

In some instances, efforts have been directed toward the use of adhesives to attach components to sheet-metal materials. However, uniform dispensing of an adhesive is extremely difficult when manually performed and is, to a substantial extent, problematical and expensive with automated equipment. If excess adhesive is applied, it creates an area on the material having excess cured adhesive in the final product, and a thicker layer takes longer to cure. If too little adhesive is applied, the ability of the adhesive to bond the component to the sheet-metal material is seriously derogated. In most instances, the adhesive must fully cure before a door panel is placed in operation, and, when cured, the adhesive must withstand the temperature extremes that a door will undergo in its normal service environment. Depending upon the type of production line and the rate of production, problems are encountered if the components to be attached are allowed to set for several minutes before being installed. In instances of such a delay, the adhesive may harden to such an extent that the glued components must be discarded. At the other end of the spectrum, most adhesives for applications of this type take several hours to fully cure. In many instances, the panels are packaged at the conclusion of the production line before the adhesive is cured, such that movement of the components on the sheet-metal material may occur during packaging, resulting in misalignment of the components, which produces later installation or operational problems in the inability of the components to precisely interact with other elements. Finally, installers and consumers are unable to successfully replace a damaged or missing component by the use of adhesives in the field, such that panels must be replaced in their entirety when replacement of a component is necessary.

For many years in the sectional door and other fields, the use of tapping screws has been a highly popular means of securing components to the sheet metal. During most of the time period, sheet metals for sectional doors and many applications have been of a thickness greater than 0.032 of an inch, which has provided sufficient material thickness to allow the screw to tighten and apply compressive forces to the component without stripping the screw threads formed in the sheet-metal material by the screw. In this normal practice, the component to be fastened to the sheet-metal material has a clearance hole somewhat larger than the screw and the sheet-metal is drilled or perforated by the screw and the component is secured to the sheet-metal material by tightening the screw and applying a compressive force against the component.

In recent years, strides have been made in the sectional door and related industries to create panels with reduced quantities of raw materials while retaining comparable strength and temperature-resistant characteristics. In this respect, many manufacturers are employing sheet-metal materials having a thickness which is substantially less than 0.032 of an inch while providing foam adhesion and reinforcing characteristics that maintain comparable strength in the overall panel configuration. The use of sheet-metal screws to attach components to sheet metal having a thickness substantially less than 0.032 of an inch typically results in the screws stripping the screw threads formed in the sheet-metal material before adequate compressive forces can be applied against the component, or the sheet metal will at least deteriorate in the area of the screw hole, causing a drop in the compressive force against the component, which may produce loosening or failure due to fatigue factors once the panel is placed in service.

Due to the desirability and feasibility of employing thinner sheet-metal materials, various developments have been made to permit the attachment of components to sheet metal having a thickness substantially less than 0.032 of an inch. One widely-adopted approach is to employ reinforcing members made of thicker, normally metallic materials on the other side of the sheet metal from the component to be attached to sandwich the thin sheet metal between the component and the reinforcing member. In the instance of sheet-metal panels or other closed bodies or where foam or other insulation is provided within the panel, the installation of the reinforcing members must occur prior to completing formation of the panel configuration and/or the foaming process. In such instances, the reinforcing members must be held precisely positioned until such time as the external component is installed on a panel. In most instances, the reinforcing members are temporarily secured by an adhesive, which creates a number of processing steps that often create additional problems. In order to achieve desirable production rates, highly-expensive automated equipment is required for ease of application of the glue and automated positioning of the reinforcing members. Whether automated equipment is employed or the application of adhesive and reinforcing members is effected manually, it is inevitable that on occasion the reinforcing members will not be precisely positioned, may come loose during subsequent processing, or are no longer precisely positioned, such that the screws do not properly secure the components to the panel, which, as a result, must be discarded. Further, in the case of such panel members, it is not always known if the reinforcing member is properly positioned and adhered until the door is installed in the field. The replacement or repair of a panel in the field is extremely time consuming and costly, particularly if the panel must be replaced due to a defectively-placed or adhered reinforcing member.

Another approach for attaching components to a thin sheet-metal panel having a thickness substantially less than 0.032 of an inch is by through-bolting of the component to the panel. In such instance, a longer screw or bolt, which extends entirely through the panel and is secured by a nut or a reinforcing member on the opposite side of the panel, is employed. This, in effect, sandwiches both skins of the sheet-metal material. In most instances, this approach is viewed as highly undesirable due to the appearance of the nut or bolt head on both sides of the panel and because a thin sheet-metal panel of this type may compress over a period of time, thereby lessening the retaining ability of the bolt. In addition, the external threading of the nut requires additional time, and, depending on the circumstances, a second person may be required to accomplish the installation.

Another technique for developing adequate material thickness to retain sheet-metal screws without stripping in thin sheet metals involves what is termed a "hemming" process. In this approach, the edge of the skins are folded over or hemmed to create two or more thicknesses of the sheet-metal material, thereby producing a sufficient cumulative material thickness to retain sheet-metal screws. Since the use of a uniform material width requires that the hem extend the entire length of a panel, the material cost of this approach is extremely high, and unnecessary weight is added to the door when only very limited extents of a longitudinal hem is actually used to attach the components.

Finally, in other instances, fasteners other than sheet-metal screws have been applied to thin sheet-metal materials to attach components thereto in the form of various types of rivets. In this respect, applications have considered tubular, semi-tubular, and solid rivets; however, as is the case with screws, rivets apply fastening tension over a relatively small area adjacent to the sheet-metal material hole and have not been successfully employed in fastening components to thin sheet-metal skins without adding a reinforcing member to the inside of the skin to sandwich the sheet-metal skin in the manner above described. Thus, while many approaches have been employed for attaching components to thin sheet-metal materials, essentially all that provide an operative solution involve additional materials, additional cost, and/or additional processing steps, which tend to reduce production rates.

DISCLOSURE OF THE INVENTION

Therefore, an object of the present invention is to provide secure connection of a component to thin sheet-metal material which is comparable to attaching components to sheet metals having a thickness greater than approximately 0.032 of an inch. Another object of the present invention is to provide such a secure connection of components to sheet-metal materials having a thickness substantially less than 0.032 of an inch without the necessity for employing reinforcing members, adhesives, or other ancillary components. A further object of the present invention is to provide such a secure connection of a component to thin sheet-metal material employing essentially a conventional tapping screw configuration.

Another object of the present invention is to provide a secure connection of a component to a sheet-metal material having a thickness even less than 0.016 of an inch with essentially a conventional thread-forming type tapping screw. A further object of the present invention is to provide such a secure connection wherein the sheet material interposed within the threads of a thread-forming screw is, in part, clamped between the threads of the screw and the component. A further object of the invention is to provide such a secure connection wherein the thread-forming tapping screw is threaded into a hole of predetermined size provided in the component and through the sheet-metal material while forming mating screw threads therein. Still another object of the present invention is to provide such a secure connection wherein the preselected hole size in the component is a function of the thickness of material from which the component is constructed in the area of the hole.

Still a further object of the present invention is to provide a secure connection of a component to thin sheet-metal material wherein the screw attachment will withstand extremely high torsional forces without stripping or commencing stripping of the screw from the sheet-metal material, such that installation of the screws can be rapidly effected and produce a secure connection by the use of an impact wrench. Still a further object of the present invention is to provide such a secure connection wherein the screws can be inserted and removed several times without damage to the component or the sheet-metal material, such that a damaged or defective component may be readily replaced in the field by a door installer or even a consumer. Yet another object of the invention is to provide such a secure connection that employs conventional components and screws without the need for either specialty parts or additional components.

Yet another object of the present invention is to provide a method of securing components to a relatively thin sheet-metal material in a manner comparable to that employed for the installation of components with sheet-metal screws on sheet-metal materials having a thickness in excess of 0.032 of an inch. A further object of the method of the present invention is to provide for creating a secure connection that may be effected either in a production line or in the field with equal facility due to the lack of necessity of special tools, jigs, or other equipment in effecting the connection. Yet a further object of the invention is to provide such a method for securing components to thin sheet metal that requires a minimum of critical operations while creating a secure, reliable connection between the screw and the component.

In general, the present invention contemplates a secure connection of a component to a sheet material including, an extent of thin sheet metal having an attaching surface, a component having a mating surface abutting the attaching surface, an aperture in the mating surface, and a tapping screw threaded in the aperture and penetrating the attaching surface, the aperture sized relative to the size of the screw as a function of the thickness of the component, whereby the tapping screw has portions of the sheet metal clamped between the tapping screw and the component for establishing retentive forces between the component and the sheet-metal material.

PREFERRED EMBODIMENT FOR CARRYING OUT THE INVENTION

Figure 1:
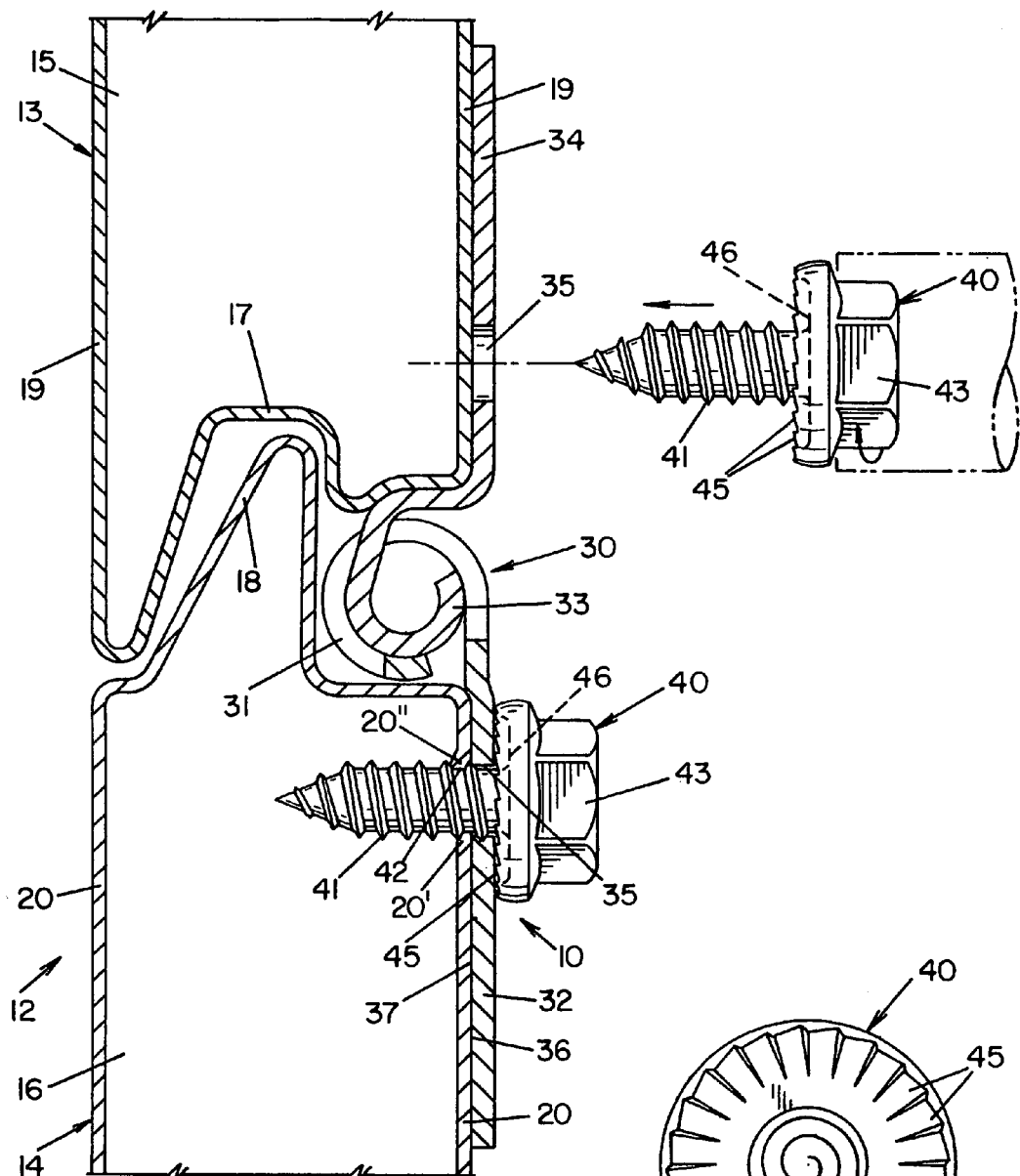
FIG. 1 is a cross-sectional view of a connection according to the concepts of the present invention showing a hinge attached to a fragmentary portion of a thin sheet-metal material in the form of adjacent, relatively pivotal panels, with a first fastener inserted in one hinge plate retentively compressing the sheet-metal material against the hinge plate and a second fastener positioned for insertion into a second hinge plate.

An exemplary secure connection according to the concepts of the present invention is generally indicated by the numeral 10 in FIG. 1 of the drawings. By way of example, the secure connection 10 is depicted in conjunction with an assembly of a sectional door, generally indicated by the numeral 12. The sectional door 12 is composed of a plurality of sections, with only a fragmentary portion of two adjacent panels, generally indicated by the numerals 13 and 14, being depicted in FIG. 1. The panels 13, 14 have body portions 15 and 16 of varying lengths that space and join longitudinal edges 17 and 18. As shown, the edge 17 is a generally concave, curvilinear surface, while the edge 18 is a substantially convex, curvilinear surface. The edges 17 and 18 are configured to matingly interfit when positioned in operative proximity, as seen in FIG. 1. As shown, the panels 13 and 14 each have an outer skin 19 and 20, respectively, which is a relatively thin sheet-metal material. For purposes of illustration, the skins 19 and 20 of sheet-metal material are substantially less than 0.032 of an inch in thickness and, in the exemplary form, are assumed to be approximately 0.010 of an inch. The panels 13, 14 may have foam insulation adhered to the interior of the skins 19, 20 of the panels 13, 14 to impart additional strength thereto, or foam or other insulating material may be positioned within the panels 13, 14 for purposes of providing insulating characteristics.

While it may be necessary or desirable to position various components on panels 13 and 14 at various locations, the secure connection 10, according to the present invention, is shown in conjunction with the securing of a hinge, generally indicated by the numeral 30, of a type that is normally placed at spaced locations longitudinally of the panels 13, 14. The hinge 30 has a first knuckle 31 that interconnects with a first leaf 32, which is positioned to overlie the skin 20 of panel 14 on the back of the panel 14 at an attachment surface 36 spaced from the panel edge 18 that receives a mating surface 37 of leaf 32. The hinge 30 has a second knuckle 33 that pivotally interfits within knuckle 31 for purposes of effecting selective articulation between the panels 13, 14. Hinge 30 has a second leaf 34 connected to second knuckle 33, which, in a manner similar to first leaf 32, overlies the skin 19 of panel 13 on the back of the panel 13 at a position spaced from the edge 17 of panel 13.

The leaves 32, 34 of hinge 30 are provided with screw-receiving holes or apertures 35 that are sized relative to the size of a screw 40 to be employed to effect the secure connection 10 of the leaves 32, 34 in a manner now to be described. For exemplary purposes, assuming the leaves 32, 34 have a thickness of approximately 0.062 of an inch, the size of the hole 35 is approximately ten percent larger than the minor diameter of the screw 40. Assuming the screw 40 to be employed in this application is a ¼-14 type AB thread-forming tapping screw, the minor thread diameter would conventionally lie in a range of approximately 0.185 to 0.192 of an inch. Thus, a hole size approximately ten percent larger than the minor thread diameter of the ¼-14 type AB thread-forming screw would dictate the size of the hole 35 as having a diameter of approximately 0.209 of an inch. With the hinge 30, screw 40, and skin material thickness specified above, torsional forces in excess of 200 inch pounds can be achieved without the screws 40 stripping in the thin skin material 20 or without damage to the skin material 20 proximate to the screws 40. Many screw attachment designs for tapping screws do not withstand torsional forces greater than 40 to 60 inch pounds without stripping. Due to the high torsion capabilities of the present secure connection 10, it is possible to achieve rapid assembly of hinge 30 or other components on skin 20 having a thickness less than 0.032 of an inch by using impact wrenches having torsional outputs in excess of 150 to 200 inch pounds, thereby coupling speed of attachment with an extremely high torsion securement of leaves 32, 34 to the skins 19, 20. The thread-forming tapping screws 40 may be driven by an impact wrench or other torsional installation device until such time as the screw 40 engagement with leaf 32 stalls the driving device.

The use of a thread-forming tapping screw 40, preferably a type AB thread-forming screw pursuant to ANSI/ASME standards, permits achieving the performance described. A type AB thread-forming screw has conventional spaced tapping screw threads with a threaded gimlet that permits penetration of thin sheet metal below approximately 0.032 of an inch without the necessity of preformed holes. Type BP thread-forming screws having an unthreaded gimlet or other similar tapping screws might be employed, depending upon the constitution and thickness of the sheet material to which a component is to be attached.

The use of a thread-forming type tapping screw 40 displaces material of the skin 20 into the threads 41 of the screw 40. As the screw 40 is torqued down against the leaf 32, there is a clamped portion 20' of the skin 20 proximate the threaded opening 42 in skin 20, which is pressed flat against the underside of leaf 32 by threads 41 in screw 40, as seen to the right of screw 40 in FIG. 1. There is also a wedged portion 20" of the skin 20, which is angularly interposed between the threads 41 of screw 40 and the underside of the leaf 32, as seen to the left of screw 40 in FIG. 1. In the exemplary material thicknesses described above, the clamped portion 20' of skin 20 extends circumferentially on the order of 90 to 180 degrees about the aperture 35 in leaf 32 and normally for approximately 120 degrees. The wedged portion 20" of skin 20 assumes the remainder of the circumferential extent of skin 20 about aperture 35, with the angularity of the wedged portion 20", relative to the axis of the screw 40 varying at differing circumferential locations. The particular angular extents of the clamped portion 20' and wedged portion 20" vary depending upon thread pitch of the screw 40 and other variables. The combination of clamped portion 20' and wedged portion 20" formed in skin 20 contributes to the resistance to stripping at high torquing, as discussed hereinabove.

While some advantages contemplated by the present invention might be achieved with other types of tapping screws, thread-forming screws are preferred over thread-cutting screws or self-drilling tapping screws, which tend to sever a portion of the skin material in the form of chips or fine pieces. As a result, the area of material available to form clamped portion 20' and wedged portion 20" would necessarily be reduced, such that stripping of such a screw would likely occur at substantially reduced torsional clamping forces.

It has been empirically determined that the size of the aperture 35 in the leaf 32 should be varied relative to the size of the screw 40 as a function of the thickness of the leaf 32. For example, for a leaf 32 or other component having a thickness of approximately 0.125 of an inch, the size of the aperture 35 should be approximately twenty percent larger than the minor diameter of the screw 40. In regard to lesser component thicknesses, with a component thickness of approximately 0.034 of an inch, the size of the aperture 35 should be approximately the same as the minor diameter of the screw 40; with a component thickness of approximately 0.020 inches, the size of the aperture 35 should be approximately ten percent less than the minor diameter of the screw 40; and with a component thickness of less than approximately 0.016 of an inch, the size of the aperture 35 in the component should be formed by the screw 40 itself. For intermediate component thicknesses between those noted above, an approximate size of aperture 35 appropriate for practicing the invention may be determined by extrapolation.

The screw 40 is shown in FIG. 1 as being provided with a standard type of hex head 43. However, it is to be appreciated that the particular application factors, such as torque requirements, accessibility of the screw head, and other similar considerations that are considered in any tapping screw connection, may dictate other head styles, such as flat countersunk, oval countersunk, pan, or specialty heads of various types.

Figure 2:
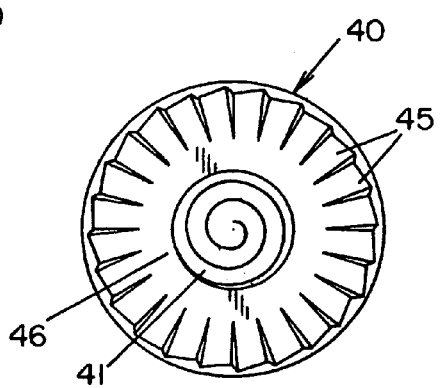
FIG. 2 is a bottom plan view of an exemplary fastener for utilization in practice of the invention showing particularly a plurality of circumferentially-spaced, substantially radially-directed serrations on the underside of the screw head.

Referring to FIGS. 1 and 2, the screw 40 preferably has the underside of the head provided with a plurality of substantially radially-directed serrations 45. As shown, the serrations 45 are substantially circumferentially equidistantly spaced about the entire circumference of the edge of the underside of screw head 43. As shown, the serrations 45 are provided with clockwise engagement to assist in creating friction to stall rotation of screw 40 against leaf 32 and to effect locking of the screw 40 in its torqued position to thereby reduce any tendency of screw 40 to reverse rotate and thus loosen the secure connection 10. The underside of screw head 43 may be provided with a recess 46 of relatively shallow axial depth and preferably positioned radially inwardly of the serrations 45 to expose the serrations 45 and accentuate their gripping ability on the face of leaf 32 or other component to be fastened.

It will be appreciated by persons skilled in the art that the direction and magnitude of forces applied to the sheet-metal skin, components and screws will be infinitely variable, depending upon the particular application. In this respect, it is noteworthy that failure of the connection normally takes place in the sheet-metal skin where the screw penetrates or where the periphery of the component footprint is in engagement with the skin. Depending upon the location and type of a premature failure below the required strength, various design features can be altered to achieve the requisite performance, many of which involve characteristics known in the art to effect structural strength. For example, improved strength for the preferred connection depicted herein can be achieved by employing larger screws, employing more screws, locating the screws closer to the periphery of the component footprints in engagement with the skin, and increasing the size of the component footprint in engagement with the skin. It will be appreciated that an improved design may often result in utilization of a number of these considerations to some extent. These known principles can be employed to use as few screws as are necessary and as small of screws as possible, all for purposes of minimizing costs while achieving a secure attachment of a component to a thin sheet-metal material.

It is also to be appreciated that a number of layered components may be attached to thin sheet metal employing the above principles and the method hereinafter described. In such instance, the component, in engagement with the thin sheet metal, has the aperture 35 sized in accordance with the functional relation described hereinabove. Any additional components are positioned on the threads of screw 40 above the component in engagement with the thin sheet metal, and those components are provided with a clearance hole that provides for free passage of the threads of screw 40 therethrough.

The method of installing a component such as hinge 30 on a thin sheet material 20, such as an enclosed panel, contemplates a series of steps that overall constitute a relatively simple but highly effective and secure connection of the component to the sheet material. Initially, the method contemplates providing a component having a screw aperture sized relative to the size of the screw(s) for attaching the component as a function of the thickness of the component in the area of the aperture according to the relationships described hereinabove. The sheet material to which the component is to be attached is supplied in a form ready for attachment of the component, irrespective of whether the material is internally accessible from the outside.

With the component to be attached, the sheet material, and the selected screw available, the component is placed in contact with or in close juxtaposition to the sheet material. It is preferred that there be no intermediate materials between the component and the sheet material. The use of adhesive tape or an adhesive between the component and the sheet material, in addition to requiring further processing steps, appears to be otherwise disadvantageous in resulting in premature failures, which may occur in the event there is any gap—even that formed by the presence of adhesive or tape between the component and the sheet metal. Thereafter, the tapping screw is located in the aperture in the component and rotated to effect threading in the aperture in the component and to penetrate the thin sheet material and effect the formation of mating threads therein, as described hereinabove. Continued rotation of the tapping screw, while maintaining the component and the sheet material in engagement with no gap therebetween, until stalling results in the establishment of a secure connection with high torsion forces with the sheet material clamped and wedged against the component, as described hereinabove, without stripping the screw 40 from the screw threads formed in the sheet material. The screw is maintained locked in position by virtue of serrations or other protuberances on the underside of the screw head, which engage the face of the component.

Thus, it should be evident that the screw connection of components to sheet-metal material and the method of effecting connection disclosed herein carries out one or more of the objects of the present invention set forth above and otherwise constitutes an advantageous contribution to the art. As will be apparent to persons skilled in the art, modifications can be made to the preferred embodiment disclosed herein without departing from the spirit of the invention, the scope of the invention herein being limited solely by the scope of the attached claims.

The invention claimed is:

1. A secure connection of a component to sheet material comprising, an extent of thin sheet metal material having an attaching surface, the component having a mating surface abutting said attaching surface, an aperture extending through the component at said mating surface, and a tapping screw having threads which are threaded in said aperture and threaded in said attaching surface, said aperture being initially sized relative to the size of said screw as a function of the thickness of said component, whereby said tapping screw has portions of said sheet metal material clamped between said threads of said tapping screw and said component for maintaining retention of said component in abutting relation with said sheet metal material without additional compressive forces.

2. A secure connection according to claim 1, wherein said tapping screw is a thread-forming tapping screw.

3. A secure connection according to claim 2, wherein said thread-forming tapping screw has a head with serrations for engaging said component to create friction to stall rotation of said thread-forming tapping screw against said component and to resist reverse rotation of said thread-forming tapping screw tending to loosen the screw.

4. A secure connection according to claim 3, wherein said serrations are directed substantially radially of said screw head.

5. A secure connection according to claim 4, wherein said screw head has an underside with said serrations located thereon and substantially circumferentially equidistantly spaced thereabout.

6. A secure connection according to claim 4, wherein said screw head has an underside with a recess which accentuates the engaging ability of said serrations.

7. A secure connection according to claim 1, wherein said attaching surface has a clamped portion between said threads of said tapping screw and said mating surface of said component.

8. A secure connection according to claim 7, wherein said attaching surface has a wedged portion angularly interposed between said threads of said tapping screw and said mating surface of said component.

9. A secure connection according to claim 7, wherein said clamped portion extends circumferentially approximately 90 to 180 degrees about said aperture in said mating surface.

10. A method of securing a component to a sheet metal material with a fastener comprising the steps of,
providing the component with a screw aperture,
providing the sheet metal material to which the component is to be attached,
placing the component in engagement with the sheet metal material,
locating a tapping screw in the screw aperture in the component,
rotating the tapping screw while maintaining the component and sheet metal material in engagement to penetrate the sheet metal material, to threadingly engage the sheet metal material and the component, and to rotationally stall the screw against the component.

11. The method according to claim 10 comprising the further step of,
providing clamping and wedging engagement of the sheet metal material against the component by employing the tapping screw to deflect portions of the sheet metal material engaged by the tapping screw.

12. A method according to claim 10 comprising the further step of,
providing the tapping screw with a screw head and with serrations on the screw head to create friction to stall rotation of the tapping screw against the component and to lock the tapping screw in its torqued position.

13. The method according to claim 10, comprising the further step of,
employing an impact wrench to rotate the tapping screw to stall against the component.

14. The method according to claim 10 comprising the further step of,
providing the screw aperture in the component with a size relative to the size of the tapping screw as a function of the thickness of the component.

15. A secure connection of a component to sheet material comprising, an extent of thin sheet metal, the component having a surface abutting said sheet metal material, an aperture in said surface of said component, and a tapping screw having threads which are threaded in said aperture and threaded in said sheet metal, said aperture being sized relative to the size of said tapping screw so that said threads of said tapping screw threadingly engage said aperture to an extent, said tapping screw being torqued to stall against said component to maintain the abutting relation between said component and said sheet metal.

16. A secure connection according to claim 15, wherein said tapping screw is a thread-forming tapping screw.

17. A secure connection according to claim 16, wherein said thread-forming tapping screw has a head with serrations for engaging said component to create friction to stall rotation of said thread-forming tapping screw against said component and to resist reverse rotation of said thread-forming tapping screw tending to loosen the screw.

18. A secure connection according to claim 15, wherein said sheet metal has a clamped portion between said threads of said tapping screw and said mating surface of said component.

19. A secure connection according to claim 18, wherein said sheet metal has a wedged portion angularly interposed between said threads of said tapping screw and said mating surface of said component.

20. A secure fastener connection to thin material comprising, an extent of thin sheet metal having an attaching surface, a component having a contact surface abutting said attaching surface of said sheet metal, a tapping screw having threads, and an aperture in said contact surface of said component being initially sized relative to the size of said screw as a function of the thickness of said component, said threads of said tapping screw engaging said aperture and threaded in said attaching surface to create a clamped portion of said sheet metal pressed flat against said contact surface by said threads and to create a wedged portion angularly interposed between said threads and said contact surface, whereby said sheet metal is maintained clamped and wedged against said component.

21. A secure fastener connection according to claim 20, wherein said clamped portion extends through approximately 90 to 180 degrees relative to the circumference of said aperture in said component and said wedged portion extends over the remainder of said circumference of said aperture in said component.

22. A secure fastener connection according to claim 20, wherein said tapping screw has a head with serrations for engaging said component to stall rotation of said tapping screw prior to stripping and to lock said tapping screw in its stalled position.

23. A secure fastener connection according to claim 20, wherein said tapping screw has a head and means on said head for stalling rotation of the screw against said component.

24. A secure fastener connection according to claim 20, wherein said tapping screw has a head and means on said head for locking said tapping screw against said component.

25. A secure fastener connection according to claim 20, wherein said tapping screw has a head with means on said head to assist in creating friction in engaging said component.

* * * * *